Oct. 25, 1955     W. W. MOE     2,721,908
HIGH IMPEDANCE PROBE
Filed Aug. 13, 1949
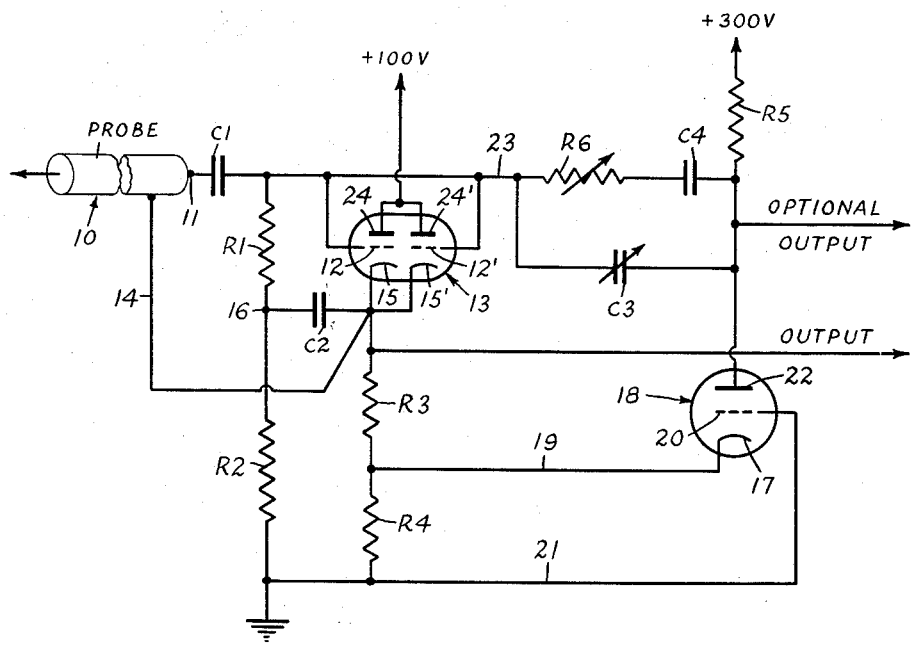
*INVENTOR.*
WILLIAM WEST MOE
BY
Campbell, Brumbaugh, Free & Graves
HIS ATTORNEYS.

United States Patent Office 2,721,908
Patented Oct. 25, 1955

2,721,908

HIGH IMPEDANCE PROBE

William West Moe, Stratford, Conn., assignor to Time, Incorporated, New York, N. Y., a corporation of New York Application August 13, 1949, Serial No. 110,220

4 Claims. (Cl. 179—171)

The present invention relates to high impedance circuits and more specifically to a novel and highly effective high impedance coupling circuit which imposes substantially nil capacity and resistance loading upon the circuit to which it is connected.

In testing electronic equipment or the like, it is frequently difficult to obtain accurate test results because the capacity and resistance loading introduced by the test equipment tend to modify operating conditions in the circuit under test. This problem often arises in circuits where the impedance of the measuring equipment is of the same order of magnitude as the impedance across which a voltage is to be measured, for example, and it may be quite serious in circuits designed for operation at high frequencies.

The principal object of the present invention, accordingly, is to provide a new and improved coupling circuit which imposes substantially nil capacity and resistance loading upon the circuit to which it is connected.

Another object of the invention is to provide a new and improved measuring circuit of the above character which does not appreciably modify operating conditions in a circuit to which it is connected.

These and other objects of the invention are attained by providing a coupling circuit comprising a cathode follower designed for maximum A. C. input resistance and minimum input capacitance. A portion of the output of the cathode follower is amplified without change of phase and is fed back into the grid circuit of the cathode follower through resistance and capacity elements, respectively, to effect a further increase in the A. C. input resistance and a further decrease in the input capacitance of the circuit.

Additional objects and advantages of the invention will become apparent from the following detailed description of a representative embodiment thereof, taken in conjunction with the single accompanying figure.

In the typical form of the invention shown in the figure, a conventional probe 10 is shown, the inner conductor 11 of which is connected through a condenser C1 to the grids 12 and 12' of a conventional double triode 13 which may be of the 6J6 type, for example which, according to the General Electric Tube Manual of 1946, has a grid-to-cathode capacitance of 0.25 mmf. per triode section or 0.5 mmf., for both sections. The shield of the probe 10 is connected by a conductor 14 to the cathodes 15 and 15' of the tube 13. Connected between the grids 12 and 12' of the tube 13 and ground are a pair of series connected resistors R1 and R2, the junction point 16 being connected by a condenser C2 to the cathodes 15 and 15' of the tube 13. Cathode resistors R3 and R4 are connected between the cathodes 15 and 15' of the tube 13 and ground, as shown.

The portion of the circuit described above constitutes a cathode follower which preferably is designed so that the voltage developed on the cathode is about 90% of the grid voltage. Under these conditions, the probe cable capacitance and the grid-cathode capacity of the tube 13 are reduced to about 10% of their static capacity. Further, with the connections shown, the effective A. C. resistance of the resistor R1 is increased to about ten times its static value. Since condenser C2 and resistors R3 and R4 have relatively low impedance values for alternating signals within the frequency range employed, the resistor R1 represents the significant input impedance element for the input circuit to grids 12, 12'. Thus if R1 has a value of, say, 3.3 megohms, the apparent input impedance will be about 33 megohms.

In order to decrease still further the capacity of the probe 10, and to increase the A. C. input resistance, a portion of the output from the cathode follower 13 is amplified without change of phase and is fed back into the input circuit of the tube 13 through capacity and resistance elements suitably chosen for this purpose. Thus, the portion of the output of the tube 13 which appears across the resistor R4 is impressed upon the cathode 17 of a conventional triode 18 through a conductor 19, the grid 20 of the triode 18 being connected to ground by a conductor 21, as shown, the plate 22 of the tube 18 is connected through plate load resistor R5 to a suitable source of plate supply (not shown).

The voltage output from the tube 18, which is greater than the grid voltage in the input circuit of the tube 13, is fed through a small adjustable condenser C3 and a conductor 23 to the grids 12 and 12' of the tube 13, the value selected for the condenser C3 being sufficient to neutralize the remaining probe capacitance to zero.

In similar fashion, the output from the tube 18 is fed through a D. C. blocking condenser C4, a variable resistor R6 and the conductor 23 to the grids 12 and 12' of the tube 13, thus feeding back current of suitable phase and magnitude to increase the resistance of the input probe substantially to infinity.

As is apparent by tracing out the instantaneous polarities of the signals passing through tubes 13 and 18, the signals derived from tube 18 and impressed upon grids 12 and 12' of tube 13 are regenerative in nature with respect to the original signals at the same grids.

While the values selected for the circuit elements in the circuit shown in the figure are not critical, the following values have been found satisfactory:

| | | |
|---|---|---|
| C1 | mf__ | .05 |
| C2 | mf__ | .1 |
| C3 | mmf__ | 3 |
| C4 | mf__ | .1 |
| R1 | megohms__ | 3.3 |
| R2 | do____ | 1.2 |
| R3 | ohms___ | 3,000 |
| R4 | do____ | 1,000 |
| R5 | do____ | 68,000 |
| R6 | megohms__ | 10 |

It will be noted that the 3 mmf. value selected for capacitor C3 is of the same order of magnitude as the heretofore-mentioned grid-to-cathode value of cathode follower tube 13. Also the 10 megohm value for resistor R6 is of the same order of magnitude as the heretofore-mentioned apparent input impedance to the tube. Condenser C3 and resistor R6 have such orders of magnitudes to provide a feedback signal of sufficiently small amplitude that exact mutual cancellation occurs between the feedback signal current and whatever input signal current is drawn by grids 12, 12' because of residual tube capacitance or residual conductance in the input circuit to the grids.

It will also be noted that R3 is of larger value than R4 and that cathode 17 of grounded grid amplifier tube is connected to the junction point between these resistors rather than to the cathode of cathode follower tube 13 to provide the result that tube 17 receives as an input only a fraction of the output signal of the cathode follower tube. Such connection of tube 17 is advantageous since it tends to minimize the loading effect of the low input impedance of tube 17 upon the cathode follower load, this loading effect decreasing the gain and, hence, the apparent input impedance of the cathode follower. Moreover, such connection of tube 17 is advantageous since by cutting down the gain of the amplifier it permits use of a wider range of amplitudes for the input signals to cathode follower tube 13 without accompanying distortion in tube 17, and it also permits reactive and resistance values for C3 and R6, respectively, of no greater order of magnitude than these shown in the above table.

Satisfactory results have been obtained with 100 volts applied to the plate electrodes 24 and 24' of the tube 13 and with 300 volts applied to the plate 22 of the tube 18 through the resistor R5.

Under the typical conditions outlined above, the output impedance of the cathode follower 13 is about 100 ohms. If the output is taken from the plate 22 of the tube 18, where a higher voltage is available, the output impedance is about 30,000 ohms. The 100 ohms output, and in many cases the 30,000 ohms output, is sufficiently low to drive conventional test apparatus such as oscilloscopes, volt meters, or the like.

From the foregoing, it will be apparent that the invention provides a novel and highly effective coupling circuit which imposes a minimum capacity and resistance loading upon any circuit to which it may be connected. With the typical values suggested above, the circuit has an input impedance exceeding 30 megohms over the entire audiofrequency range and it is of special utility wherever a coupling circuit of very high impedance is required. For example, it may be employed to couple a conventional vacuum volt meter or oscilloscope into a radio or television receiver. The circuit may also be of use in other applications such as, for example, in coupling to a photoelectric cell for the purpose of securing a high output voltage with low light inputs.

The single embodiment described herein by way of illustration is obviously susceptible of numerous modifications within the spirit of the invention and it is not intended to impose any restriction whatsoever upon the scope of the following claims.

I claim:

1. An impedance conversion signal transfer device comprising, in combination, an electron tube having plate, grid and cathode electrodes, a pair of resistors connected in series between said grid electrode and ground, an input circuit including said cathode and grid electrodes for supplying to said grid electrode an input signal to be transferred through said device, a capacitance connected between the junction of said two resistors and said cathode electrode, cathode resistor means connected between said cathode electrode and ground to form with said tube a cathode follower circuit with a high apparent input impedance, electron tube amplifier means having a grounded grid, a cathode connected by a non-resonant circuit to said cathode resistor means, a plate, and a non-resonant load connected with said plate, and high reactance condenser means connected between said load and said grid electrode to feed back regeneratively a phase-shifted portion of the output from said load to said grid electrode to cause said portion to mutually cancel with the input signal reactive current component drawn at said grid electrode by the residual capacitance of said tube, the said cathode resistor means being adapted to develop as an output for said device the input signal supplied to said grid electrode at an output impedance which is of low value relative to said apparent input impedance.

2. An impedance conversion signal transfer device comprising, in combination, an electron tube having plate, grid and cathode electrodes, a pair of resistors connected in series between said grid electrode and ground, an input circuit including said cathode and grid electrodes for supplying to said grid electrode an input signal to be transferred through said device, a capacitance connected between the junction of said two resistors and said cathode electrode, cathode resistor means connected between said cathode electrode and ground to form with said tube a cathode follower circuit with a high apparent input impedance, electron tube amplifier means having a grounded grid, a cathode connected by a non-resonant circuit to said cathode resistor means, a plate, and a non-resonant load connected with said plate, and a serially coupled low-reactance capacitor and high-resistance resistor connected between said load and said grid electrode to feed back regeneratively a portion of the output from said load to said grid electrode of said tube to cause said portion to mutually cancel with the input signal resistive current component drawn by said apparent input impedance, said high-resistance resistor having a resistance value of the order of said apparent input impedance, the said cathode resistor means being adapted to develop as an output for said device the input signal supplied to said grid electrode at an output impedance which is of low value relative to said apparent input impedance.

3. An impedance conversion signal transfer device comprising, in combination, an electron tube having plate, grid and cathode electrodes, a pair of resistors connected in series between said grid electrode and ground, an input circuit including said cathode and grid electrodes for supplying to said grid electrode an input signal to be transferred through said device, a capacitance connected between the junction of said two resistors and said cathode electrode, cathode resistor means connected between said cathode electrode and ground to form with said tube a cathode follower circuit with a high apparent input impedance, electron tube amplifier means having a grounded grid, a cathode connected by a non-resonant circuit to said cathode resistor means, a plate, and a non-resonant load connected with said plate, high reactance capacitance means connected between said load and said grid electrode to feed back regeneratively a first phase-shifted portion of the output of said load to said grid electrode to cause said first portion to mutually cancel with the input signal reactive current component drawn at said grid electrode by the residual capacitance of said tube, said high reactance capacitance means having a capacitance value of the same order as said residual capacitance, and a serially coupled low reactance capacitance and high resistance resistor connected between said load and said grid electrode to regeneratively feed back a second portion of the output of said load to said grid electrode to cause said second portion to mutually cancel with the input signal resistive current component drawn at said grid electrode by said apparent input impedance, said high resistance resistor having a value of the order of said apparent input impedance, the said cathode resistor means being adapted to develop as an output for said device the input signal supplied to said grid electrode at an output impedance which is of low value relative to said apparent input impedance.

4. A device as in claim 3 wherein the cathode resistor means comprises a first resistor and a second smaller resistor connected in series, with the first resistor being connected to the cathode of said cathode follower tube, and wherein the cathode of the grounded grid amplifier tube is coupled to the junction between said first and second resistor means.

References Cited in the file of this patent

UNITED STATES PATENTS

| | | |
|---|---|---|
| 2,086,965 | Shepard, Jr. | July 13, 1937 |
| 2,269,417 | Crosby | Jan. 6, 1942 |
| 2,273,997 | Rubin | Feb. 24, 1942 |

(Other references on following page)

UNITED STATES PATENTS

| | | |
|---|---|---|
| 2,289,301 | Barber | July 7, 1942 |
| 2,323,762 | George | July 6, 1943 |
| 2,396,224 | Artzt | Mar. 12, 1946 |
| 2,431,973 | White | Dec. 2, 1947 |
| 2,464,594 | Mahoney, Jr. | Mar. 15, 1949 |
| 2,483,410 | Grieg et al. | Oct. 4, 1949 |
| 2,489,272 | Daniels | Nov. 29, 1949 |
| 2,529,459 | Pourciau et al. | Nov. 7, 1950 |
| 2,549,761 | Adams | Apr. 24, 1951 |
| 2,601,485 | Yetter | June 24, 1952 |

OTHER REFERENCES

Publication—"Cathode-Coupled Oscillators," by Butler—Wireless Engineer, November 1944, pp. 521–526.

Text Book—Radio Engineering, by Terman, third edition, 1947, pages 367–369.